US012782284B2

(12) United States Patent
Marcus et al.

(10) Patent No.: US 12,782,284 B2
(45) Date of Patent: Nov. 3, 2026

(54) NON-LINEAR SINGLE-MOLECULE FRET AND POLARIZATION-SWEEP SINGLE-MOLECULE MICROSCOPY

(71) Applicant: University of Oregon, Eugene, OR (US)

(72) Inventors: Andrew H. Marcus, Eugene, OR (US); Claire S. Albrecht, Eugene, OR (US); John W. Maurer, Eugene, OR (US); Patrick J. Herbert, Eugene, OR (US); Dylan Heussman, Eugene, OR (US)

(73) Assignee: University of Oregon, Eugene, OR (US)

( * ) Notice: Subject to any disclaimer, the term of this patent is extended or adjusted under 35 U.S.C. 154(b) by 1046 days.

(21) Appl. No.: 17/931,870

(22) Filed: Sep. 13, 2022

(65) Prior Publication Data

US 2023/0080312 A1 Mar. 16, 2023

Related U.S. Application Data

(60) Provisional application No. 63/243,636, filed on Sep. 13, 2021.

(51) Int. Cl.

| | |
|---|---|
| ***G01N 21/21*** | (2006.01) |
| ***G01N 21/64*** | (2006.01) |
| ***G02B 5/30*** | (2006.01) |
| ***G02B 27/28*** | (2006.01) |

(52) U.S. Cl.

CPC ......... *G01N 21/6445* (2013.01); *G01N 21/21* (2013.01); *G01N 21/6408* (2013.01); *G01N 21/6428* (2013.01); *G01N 21/6458* (2013.01); *G02B 5/3083* (2013.01); *G02B 27/286* (2013.01)

(58) Field of Classification Search

None

See application file for complete search history.

(56) References Cited

U.S. PATENT DOCUMENTS

| | | | | |
|---|---|---|---|---|
| 6,455,861 | B1 * | 9/2002 | Hoyt | G01N 21/6445 356/318 |
| 10,408,758 | B2 * | 9/2019 | Diebold | G02B 21/0084 |
| 2012/0112096 | A1 * | 5/2012 | Meyers | G01N 21/21 250/459.1 |

(Continued)

OTHER PUBLICATIONS

Sandkuijl et al. "Differential microscopy for fluorescence-detected nonlinear absorption linear anisotropy . . . " Biomedical Optics Express vol. 1, No. 3, Oct. 2010, pp. 895-901 (Year: 2010).*

(Continued)

*Primary Examiner* — Neil N Turk

(74) *Attorney, Agent, or Firm* — Klarquist Sparkman, LLP

(57) ABSTRACT

Swept polarization optical beams are directed to a sample to produce fluorescence. typical as a plurality of single photon detection events. Based on frequencies associated with the polarization sweeps, orientation of a sample can be determined. Using polarization sweeps at first and second frequencies and wavelength, donor fluorophore orientation can be established based on the first frequency and wavelength and acceptor orientation can be established based on a sum or difference of the first and second frequencies and the second wavelength.

23 Claims, 8 Drawing Sheets

(56) References Cited

U.S. PATENT DOCUMENTS

| | | | | |
|---|---|---|---|---|
| 2015/0116807 A1* | 4/2015 | Anhut | G02B 21/0068 359/386 |
| 2021/0208411 A1* | 7/2021 | Engelhardt | G01N 21/6458 |

OTHER PUBLICATIONS

Mattheyeses et al. "Polarized Fluorescence Resonance Energy Transfer Microscopy," Biophysical Journal vol. 87, Oct. 2004, pp. 2787-2797 (Year: 2004).*

Samim et al. "Differential Polarization Nonlinear Optical Microscopy with Adaptive Optics . . . " Int. J. Mol. Sci. 2013, vol. 14,pp. 18520-18534 (Year: 2013).*

Ungvari et al. "Perrin and Forster unified: Dual-laser triple-polarization FRET . . . " Biochimica et Biophysica Actan 1863, 2016, pp. 703-716 (Year: 2016).*

Aitken et al., "An Oxygen Scavenging System for Improvement of Dye Stability in Single-Molecule Fluorescence Experiments," Biophys. J., 94:1826-1835 (2008).

Cho et al., "Loading Dynamics of a Sliding DNA Clamp," Angew. Chem. Int. Ed., 53:6768-6771 (2014).

Greive et al., "Thinking quantitatively about transcriptional regulation," Nat. Rev. Mol. Cell Biol., 6:221-232 (2005).

Heussman et al., "Measuring local conformations and conformational disorder of (Cy3)2 dimer labeled DNA fork junctions using absorbance, circular dichroism and two-dimensional fluorescence spectroscopy," Faraday Discuss., 216, 30 pp. (2019).

Israels et al., "Submillisecond conformational transitions of short single-stranded DNA lattices by photon correlation single-molecule Förster resonance energy transfer," J. Phys. Chem. B, 125:9426-9440 (2021).

Israels et al., "Supporting Information: Sub-Millisecond Conformational Transitions of Short Single-Stranded DNA Lattices by Photon Correlation Single-Molecule FRET," downloaded from https://pubs.acs.org/doi/10.1021/acs.ipcb.1c04119, pp. S1-S23 (document not dated, downloaded on Sep. 13, 2022).

Kelch et al., "Clamp loader ATPases and the evolution of DNA replication machinery," BMC Biology, 10:1-14 (2012).

Kringle et al., "Temperature-dependent conformations of exciton-coupled Cy3 dimers in double-stranded DNA," J. Chem. Phys., 148:085101 (2018).

Lee et al., "Single-molecule FRET studies of the cooperative and non-cooperative binding kinetics of the bacteriophage T4 single-stranded DNA binding protein (gp32) to ssDNA lattices at replication fork junctions," Nucleic Acids Res., 44:10691-10710 (2016).

Phelps et al., "Single-molecule FRET and linear dichroism studies of DNA breathing and helicase binding at replication fork junctions," Proc. Natl. Acad. Sci. U.S.A., 110:17320-17325 (2013).

Plumridge et al., "The impact of base stacking on the conformations and electrostatics of single-stranded DNA," Nucleic Acids Res., 45:3932-3943 (2017).

Plumridge et al., "Visualizing single-stranded nucleic acids in solution," Nucleic Acids Res., 45(9):e66 (13 pages) (2017).

Roy et al., "A practical guide to single-molecule FRET," Nature Methods, 5:507-516 (2008).

Tamimi et al., "Fluorescence-detected Fourier transform electronic spectroscopy by phase-tagged photon counting," Opt. Express 28:25194-25214 (2020).

* cited by examiner

FIG. 3A
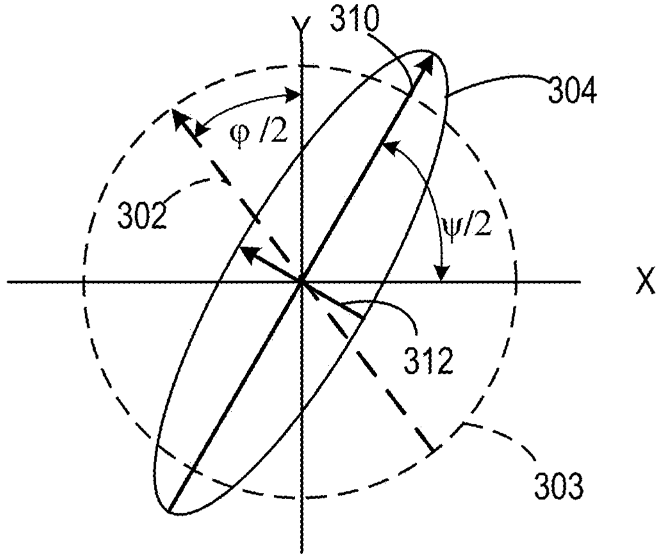
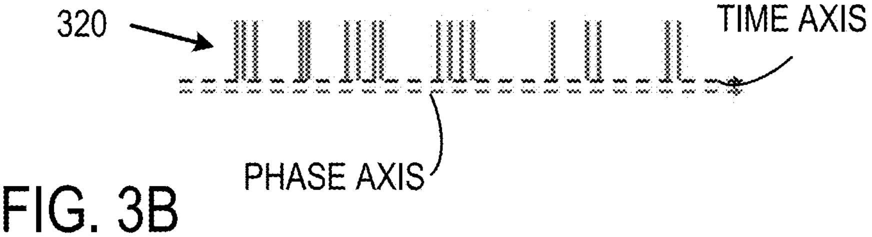
FIG. 3B
FIG. 3C
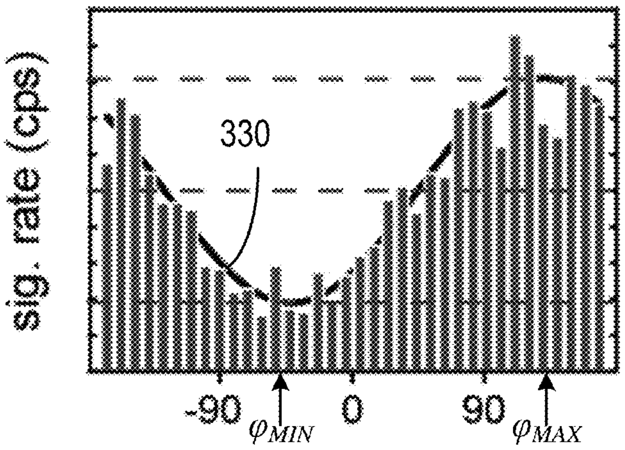

NON-LINEAR SINGLE-MOLECULE FRET AND POLARIZATION-SWEEP SINGLE-MOLECULE MICROSCOPY

CROSS REFERENCE TO RELATED APPLICATION

This application claims the benefit of U.S. Provisional Patent Application No. 63/243,636, filed on Sep. 13, 2021, which is incorporated herein by reference in its entirety.

ACKNOWLEDGMENT OF GOVERNMENT SUPPORT

This invention was made with government support under grants GM015792 awarded by the National Institutes of Health and CHE1608915 awarded by the National Science Foundation. The government has certain rights in the invention.

FIELD

The disclosure pertains to fluorescence measurement and fluorescence microscopy.

BACKGROUND

Fluorescence based Förster energy transfer (FRET) measurements can be used to study molecular dynamics in a variety of settings, such as measurements of protein-protein interactions and protein-DNA complexes. Conventional FRET measurements provide orientationally averaged measurements and do not permit assessment and quantification of orientation of single molecules. In addition, donor/acceptor FRET measurement are dependent on distances between donor and acceptor, which conventional FRET methods are unable to estimate. Alternative approaches are needed.

SUMMARY

Representative measurement apparatus comprise an optical beam source that produces a repetitive optical beam having a time-varying polarization state. A detection system includes a detector situated to receive fluorescence from a sample responsive to the repetitive optical beam to produce a fluorescence signal, wherein the detection system is operable to establish a sample orientation based on the fluorescence signal. In some cases, the time-varying polarization state is a variation in linear polarization between orthogonal linear polarization states such as a periodic linear polarization sweep. In typical examples, the fluorescence signal comprises a plurality of single photon detection events that are time and phase tagged with respect to the periodic linear polarization sweep. In some examples, the optical beam source includes a laser situated to produce an optical beam, a first acousto-optic modulation situated to apply a phase modulation to a first linear polarization component of the optical beam, a second acousto-optic modulator situated to apply the phase modulation to a second linear polarization component of the optical beam, wherein the second linear polarization differs from the first linear polarization. A beam splitter is situated to receive and combine the first and second phase modulated linear polarization components to produce a combined beam and a quarter-wave retarder is situated to receive the combined beam and so that the repetitive optical beam has a linear polarization sweep. In some examples, the detection system is operable to determine a fluorescence signal visibility defined as a ratio $$\frac{(I_{MAX} - I_{MIN})}{(I_{MAX} + I_{MIN})},$$

wherein $I_{MAX}$ and $I_{MIN}$ correspond to maxima and minima of the fluorescence signal.

Representative methods comprise applying a polarization modulated optical beam to a sample and based on fluorescence produced in response to the polarization modulated optical beam, determine a sample orientation. In some examples, the polarization modulated optical beam is a linear swept polarization optical beam. In other examples, the polarization modulated optical beam includes a variation in linear polarization between orthogonal linear polarization states. In typical examples, the fluorescence is detected as a plurality of single photon detection events with associated phases and times, wherein the sample orientation is determined based on the detection events and the associated phases and times. In some examples, a histogram of detection events as a function of the associated phases is defined to determine a visibility.

In some examples, the polarization modulated optical beam is produced by phase modulating at least one linear polarization component of an input optical beam. In some examples, the polarization modulated optical beam is produced by phase modulating first and second linear polarization components of an input optical beam and combining the phase modulated first and second linear polarization components. In examples, the combined phase modulated first and second linear polarization components are directed to a quarter wave retarder to produce a linear polarization sweep.

Measurement apparatus comprise an optical beam source that produces first and second repetitive optical beams having time-varying polarization states at first and second wavelengths and first and second modulation frequencies. A detection system includes first and second detectors situated to receive fluorescence from a sample responsive to the first and second optical beam, respectively, and produce first and second fluorescence signals, wherein the detection system is operable to establish an orientation of a first sample component based on the first fluorescence signal and an orientation of a second sample component based on a modulation of second fluorescence signal at a frequency corresponding to a sum or difference of the first and second modulation frequencies. In some examples, the first and second repetitive optical beams are produced by combining phase modulated first and second linear polarization components of each and directing the combined beam to a quarter wave retarder to produce variable linear polarizations of each of the first and second repetitive optical beams. In examples, the first and second fluorescence signals comprise respective pluralities of single photon detection events that that are phase and time tagged and combined in respective first and second event histograms, wherein the orientation of at least the first or second sample component is based on a visibility associated with the respective histogram. In some examples, first sample component includes a donor fluorophore and the second sample component includes an acceptor fluorophore.

Methods comprise applying first and second polarization swept optical beams to a sample at respective first and second wavelengths and first and second frequencies and accumulating fluorescence signal events corresponding to fluorescence produced in response to the first and second polarization swept optical beams. Based on the fluorescence signal events associated with the first wavelength and the first frequency, an orientation of a first sample component is determined. Based on the fluorescence signal events associated with the second wavelength and a sum of or difference between the first frequency and the second frequency, an orientation of a second sample component is determined. In further examples, the first sample component includes a donor fluorophore and the second sample component includes an acceptor fluorophore.

The foregoing and other objects, features, and advantages of the invention will become more apparent from the following detailed description, which proceeds with reference to the accompanying figures.

BRIEF DESCRIPTION OF THE DRAWINGS

FIG. 3A illustrates molecular orientation and swept polarization.

FIG. 3B illustrates single photon detection events.

FIG. 3C illustrates a histogram of single photon detection events.

DETAILED DESCRIPTION

General Considerations

Figure 1:
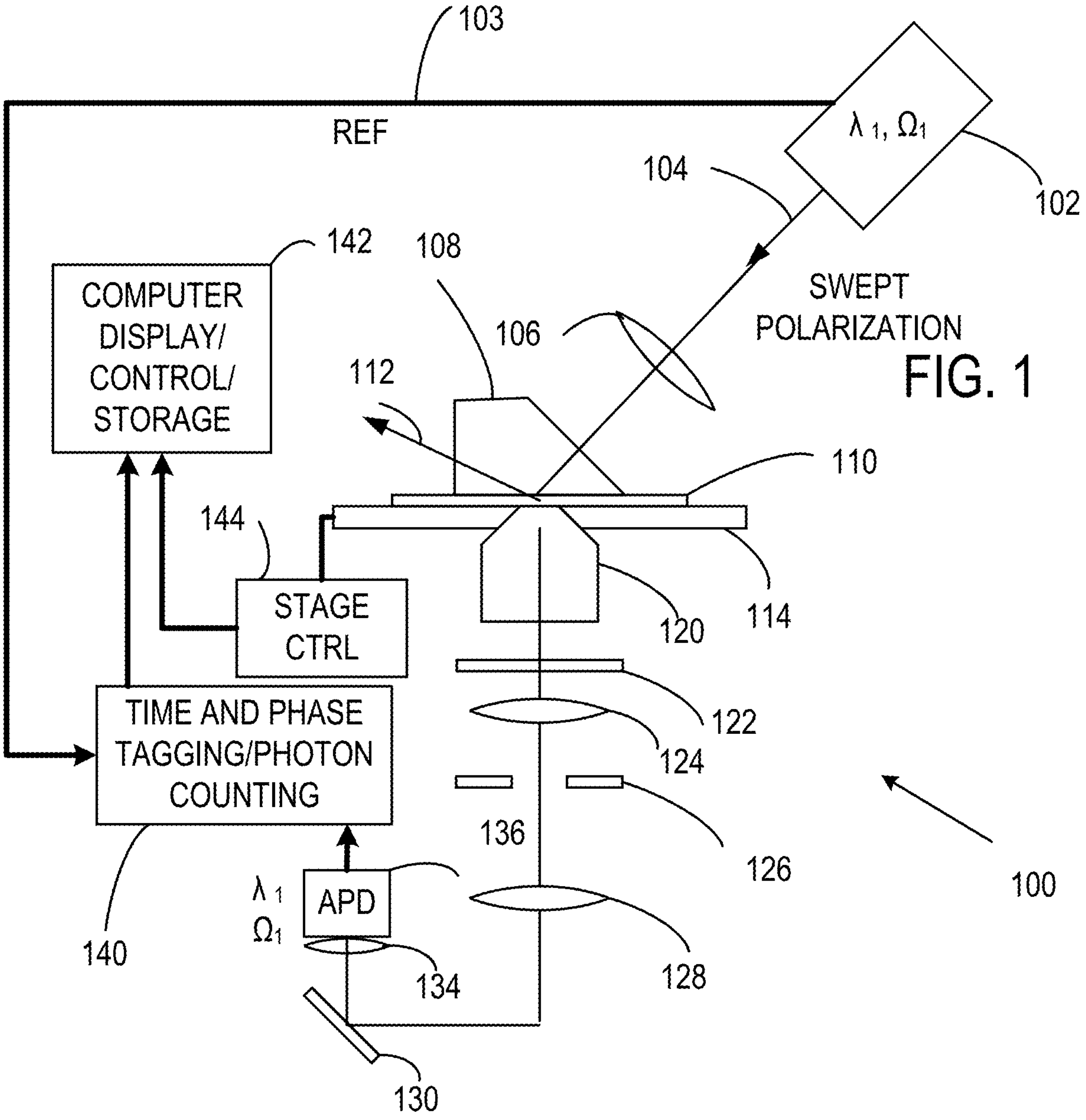
FIG. 1 illustrates a representative swept polarization, single-molecule fluorescence measurement system.

As used in this application and in the claims, the singular forms “a,” “an,” and “the” include the plural forms unless the context clearly dictates otherwise. Additionally, the term “includes” means “comprises.” Further, the term “coupled” does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like “produce” and “provide” to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as “lowest”, “best”, “minimum,” or the like. It will be appreciated that such descriptions are intended to indicate that a selection among many used functional alternatives can be made, and such selections need not be better, smaller, or otherwise preferable to other selections.

Examples are described with reference to directions indicated as “above,” “below,” “upper,” “lower,” “horizontal,” “vertical,” and the like. These terms are used for convenient description, but do not imply any particular spatial orientation. For purposes of illustration, particular examples are described with selected modulation frequencies, wavelengths, and other parameters but it will be appreciated that these are examples and other selections can be made.

As used herein, propagating optical radiation is referred to as a beam or beams, regardless of collimation; emitted fluorescence is referred to as fluorescence. Detector outputs responsive to optical radiation are referred to as signals and include electrical voltages, currents, or combinations thereof. In typical examples, single photon detection is used producing an impulse-like signals. A plurality of such signals can be accumulated to produce an associated waveform, typically based on a histogram of detection events. In the examples, periodic polarization modulation is used but periodic or aperiodic repetitive polarization modulation can be used. Repetitive polarization modulation permits accumulation of a plurality of detection events that can be phase and time tagged to permit orientation estimation. The examples are generally directed to characterization of single molecules but orientation of other samples can be determined in the same manner. An interferometer-based optical system can be used to generation a polarization modulation such as a polarization sweep, but polarization modulation can be provided in other ways. A polarization sweep refers to a continuous or step-wise variation in linear polarization between orthogonal polarization states.

Typically, polarization sweeps or modulations between orthogonal linear polarization states are used in analysis of samples. However, systems can be similarly configured to produce modulations between other orthogonal polarization states such as circular or elliptical polarization, or between states that are not orthogonal. For convenience, polarization sweeps are shown as produced with two phase modulators but in other examples, one or more phase modulators can be used. Sweep or modulation frequencies are generally selected to be much more rapid that alignments to be probed with the swept polarizations.

Example 1. Polarization-Sweep Single-Molecule Fluorescence Measurement System Referring to FIG. 1, a representative measurement system 100 includes a swept polarization source 102 that directs a swept polarization optical beam 104 to a lens 106 and a prism 108 to irradiate a sample situated on a transparent plate 110. In this example, the optical beam 104 is at a wavelength $\lambda_1$ and the beam polarization is swept at a frequency $\Omega_1$. The optical beam 104 is totally internally reflected at the transparent plate 110 as a reflected optical beam 112. A portion of the optical beam 104 is coupled to the sample to produce fluorescence which is received by a lens 120 such as a microscope objective and coupled through a high pass filter 122 that is selected to block optical radiation at wavelength $\lambda_1$. A lens 124 is situated to direct the fluorescence through an aperture 126 and additional lenses 128, 132 and a reflector 130 are situated to further direct the fluorescence to a detector 136 such as an avalanche photodiode. The sample can be manipulated to be situated in the optical beam 104 with the stage 114 coupled to a stage controller 144. In detection of fluorescence from single molecules, the detector is operated to detect signal photons as detection events which are coupled to time/phase tagging electronics 140. As shown in FIG. 1, the swept polarization source 102 provides a reference signal 103 associated with a polarization sweep of the optical beam 104. This reference signal is coupled to the time/phase tagging electronics 140 so that the detected fluorescence (detection events) can be referenced to the polarization sweep. (Electrical connections are generally shown in the figures with heavier lines than optical beams and optical propagation axes).

The time/phase tagging electronics 140 implements a phase-tagged photon counting (PTPC) method using a field-programmable gate array (FPGA). The FPGA is configured to discretize the phase of a given modulation cycle into a set of m 'phase bins,' which are numbered and incrementally advanced using a digital counter such as an 80 MHz digital counter. A reference signal (such as a 1 MHz analog reference waveform) is first converted into a 'logical square wave' (i.e., a periodic TTL waveform) using a rising-edge comparator circuit. The logical square wave is then used to trigger an 80 MHz phase counter (16-bit width), and to reset the counter at the 1 MHz phase-sweep frequency. The counter reset automatically synchronizes the phase-sweep cycle in the presence of external room vibrations that introduce noise to the MZI reference phase. In one example, the average number of phase bins during a modulation cycle is m=80 MHz/1 MHz=80 bins, and the phase bin interval is $\Delta\varphi=360°/80=4.5°\ \text{bin}^{-1}$. Thus, during each phase-sweep cycle the counter advances the phase bin value $\varphi_j=j\Delta\varphi$ (with j=0, 1, . . . , 79) at the 1 MHz clock speed. A second 1 MHz counter (with 64 bit width) can be used to assign a time bin value $t_k=k\Delta t$ (with $\Delta t=1\ \mu s$ and k=0, 1, . . . ) to each detection event. Thus, each individual detection event is assigned a 16-bit phase bin value and a 64-bit time bin value, and these data are streamed to a computer 142. In some examples, processing is included along with the detector 134 in a detection system.

Example 2. Swept Polarization Optical Beam Source

Figure 2:
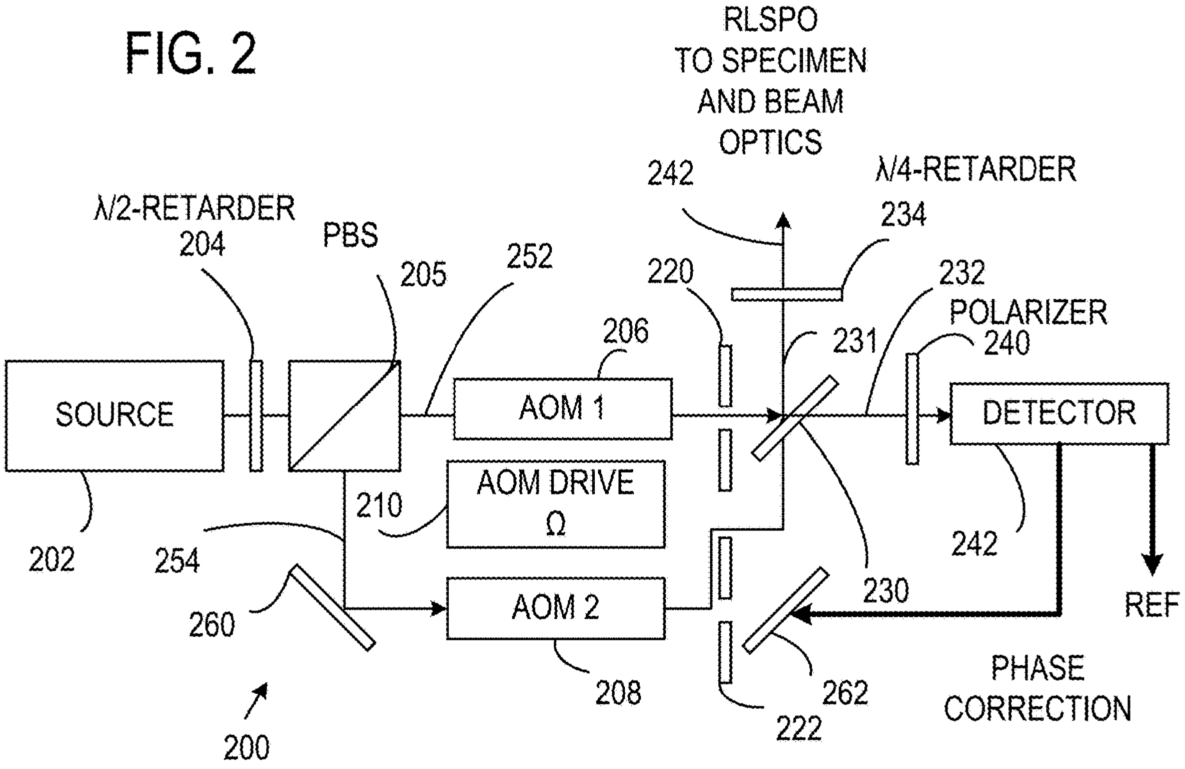
FIG. 2 illustrates a swept polarization beam source.

A representative a swept polarization source 200 such as the swept polarization source 102 is illustrated in FIG. 2. This source includes first and second optical paths configured as Mach-Zehnder interferometer. An optical beam source 202 (typically a laser that produces a continuous beam) is situated to direct a polarized optical beam to a half-wave retarder 204 so that the optical beam is divided into orthogonally polarized portions by a polarizing beam splitter (PBS) 205. The half-wave retarder 204 is generally aligned so that intensities of a transmitted beam 252 (a p-polarization) and a reflected beam 254 (an s-polarization) are approximately the same. For convenient description, the transmitted beam polarization is referred to herein also as a horizontal (H) polarization and the reflected polarization as a vertical (V) polarization. The H-polarized beam 252 and the V-polarized beam 254 are directed to respective acousto-optic modulators (AOMs) 206, 208 that are coupled to an acousto-optic modulator driver 210 to produce phase modulations of the polarized beams. The phase modulated polarized beams are directed through respective apertures in aperture plates 220, 222 and combined at a beam splitter 230. A first portion 231 of the combined beam is directed to a quarter-wave retarder 234 that is aligned so that the first portion 231 of the combined beam has a swept linear polarization. The swept linearly polarized beam is directed to an optical system for application to a sample. A second portion 232 of the combined beam is directed to a polarizer 240 and a detector 242 to produce a reference signal for time and phase tagging. Typically, an intensity of the second portion is selected to be substantially less than that of the first portion.

The AOM driver 210 is typically configured to produce a periodic phase modulation of fixed frequency $\Omega_1$ between the two linearly polarized beams so that a combined beam 242 has a polarization that varies periodically from linear (at 45 degrees from horizontal) to elliptical to circular (for example, right circular) to elliptical to linear (at −45 degrees from horizontal) to elliptical to circular (for example, left circular) and back to linear (at 45 degrees from horizontal). However, other periodic variations can be used and the resulting swept polarization can vary sinusoidally, step-wise, or in some other way. Periodic polarization sweeps are convenient, but other repetitive polarization variations without a fixed period can be used. As discussed below, systems such as shown in FIG. 1 typically use single photon detection so that fluorescence signals from multiple events are combined and periodic or repetitive beam modulations are desired.

The periodic variation in phase between orthogonal linear polarizations provided by the source 200 produces a varying state of polarization having periodic variations from linear to elliptical to circular. By orienting a quarter-wave retarder along a suitable axis the polarizations these polarizations become linear polarizations that periodically sweep between orthogonal states. This polarization sweep can be confirmed using Jones calculus as set forth in detail below.

Variations in optical path associated with propagation through each of the AOMs 206, 208 can produce additional phase modulations that are generally undesirable. Such path length differences can be compensated by adjusting positions of one or both reflectors 260, 262. For example, the reflector 262 can be secured to a piezo positioner so that an optical path length associated with the AOM 208 can be adjusted using a phase correction signal associated with a phase of the periodic variation of the reference signal. Such compensation is not needed if phase variations associated with path length variations are sufficiently small (less than 5, 10, 20, 30, or 45 degrees) or if phase correction is applied in phase and time tagging detection events as discussed below.

In an example, the optical source 202 produces an optical beam at a wavelength of 532 nm and a periodic modulation is applied at a frequency of 1 MHz. The reference signal is used in a negative feedback loop to actively minimize the path difference between the polarized beams 252, 254 using a piezo-controlled mirror.

Example 3. Representative Measurements

Measurements produced with and operation of the apparatus described above are described with reference to FIGS. 3A-3C. Referring to FIG. 3A, a swept polarization optical beam as discussed above has a rotating linear polarization 302 that rotates along a circle 303 and is shown oriented at an angle φ/2 with respect to a vertical axis, wherein φ=Ωt, wherein t is time and Ω is modulation frequency. An ellipse 304 represents sample anisotropic "polarization" indicating symmetric and antisymmetric electric dipole transition moments (EDTMs) 310, 312, respectively, of an exciton coupled dimer. As can be seen in FIG. 3A, the polarization sweeps so that the optical beam is variably coupled to symmetric and antisymmetric dipole transition moments. An angle ψ/2 corresponds to a phase difference between the applied optical fled and the linear polarization at t=0.

FIG. 3B shows a plurality of individual photon detection events 303 320 as a function of time and swept polarization phase (i.e. polarization direction). Such events can be accumulated to produce histogram that corresponds to event rate that can be display as a function of swept polarization phase. Referring to FIG. 3C, a plot of such accumulated events in a fixed time (i.e., event rate) and a sinusoidal fit 330 are shown. A minimum in the fit 330 corresponds to alignment of the linear polarization with the antisymmetric (smaller) electric dipole transition moment and the maximum in the fit 330 corresponds to alignment of the linear polarization with the symmetric (larger) electric dipole transition moment. The fit 330 thus provides a measure of sample orientation—i.e., the sample axis associated with the larger dipole moment is aligned with the linear polarization at phase $\varphi_{MAX}$ or alternatively, the sample axis associated with the smaller dipole moment is aligned with the linear polarization at phase $\varphi_{MIN}$. In addition, a visibility v of the fit 330 defined as a ratio:

$$v = \frac{(I_{MAX} - I_{MIN})}{(I_{MAX} + I_{MIN})}$$

can be shown to be a function of the transition dipole moments:

$$v = \frac{|\mu_+|^2 - |\mu_-|^2}{|\mu_+|^2 + |\mu_-|^2}$$

wherein μ+ and μ+ are the symmetric and antisymmetric electric dipole transition moments. A mean signal rate f is given by:

$$f = \frac{1}{2}\left[|\mu_+|^2 + |\mu_-|^2\right].$$

Example 4. Rotating Plane-Polarized Optical Field

The swept polarization produced by an apparatus such as illustrated in FIG. 2 can be described as follows. The plane polarization of an input optical beam is rotated to 45° from vertical using a half-wave plate, so that am initial electric field may be written in a $$\begin{pmatrix} H \\ V \end{pmatrix}$$

basis:

$$E_{initial}(\omega) = A(\omega)e^{i\omega_L t}\begin{pmatrix} 1 \\ 1 \end{pmatrix},$$

wherein A(ω) is a spectral envelope of the optical beam and $\omega_L$ is a laser center frequency ($2\pi c/\lambda_L$, wherein $\lambda_L$ can be, for example, 532 nm). The PBS separates the H and V polarization components into separate paths and within each path, and each AOM imparts a time-varying phase shift to its respective beam according to $\varphi_H=\Omega_H t$ and $\varphi_V=\Omega_V t$. Thus, the electric field components within the H and V paths can be written:

$$E_H(\omega) = A(\omega)e^{i\omega_L t}\begin{pmatrix} 1 \\ 0 \end{pmatrix}e^{i\varphi_H}$$

$$E_V(\omega) = A(\omega)e^{i\omega_L t}\begin{pmatrix} 0 \\ 1 \end{pmatrix}e^{i\varphi_V}$$

The H and V beams are recombined to produce a total field $E_{total}$:

$$E_{total}(\omega) = E_H(\omega) + E_V(\omega) = \frac{A(\omega)}{\sqrt{2}}e^{i\omega_L t}\begin{pmatrix} e^{i\varphi_H} \\ e^{i\varphi_V} \end{pmatrix}$$

This can be simplified by defining a relative phase shift $\varphi=\varphi_V-\varphi_H=\Omega_{VH}t$ between the H and V paths (with $\Omega_{VH}=\Omega=1$ MHz), and by multiplying by the overall phase shift $e^{-i(\varphi_V+\varphi_H)/2}$:

$$E_{total}(\omega) = \frac{A(\omega)}{\sqrt{2}}e^{i\omega_L t}\begin{pmatrix} e^{-i\varphi/2} \\ e^{+i\varphi/2} \end{pmatrix}$$

The beam is next directed through a quarter-wave plate that is rotated 45° from vertical. The Jones matrix' M for a quarter-wave plate is given by $$M = \frac{e^{i\pi/4}}{\sqrt{2}}\begin{pmatrix} 1 & -i \\ -i & 1 \end{pmatrix}.$$

Thus, after passing through the quarter-wave plate, the final electric field can be written compactly as:

$$\begin{aligned} E(\omega, \varphi) = E_{total}M &= \frac{A(\omega)}{2}e^{i\omega_L t}e^{i\pi/4}\begin{pmatrix} 1 & -i \\ -i & 1 \end{pmatrix}\begin{pmatrix} e^{-i\varphi/2} \\ e^{i\varphi/2} \end{pmatrix} \\ &= A(\omega)e^{i\omega_L t}\begin{pmatrix} +\cos\varphi/2 \\ -\sin\varphi/2 \end{pmatrix}, \end{aligned} \quad (1)$$

which describes the electric field incident on the sample.

Example 5. Polarized Signal Intensity with Rotating Plane Polarization Sources

The polarized single molecule fluorescence intensity can be shown to be:

$$I_P(\varphi)=f\{1+v\cos[\varphi(t)+\psi]\}$$

as discussed below. The electric field vector, E(ω,φ), is given by Eq. (1) and the symmetric (+) and anti-symmetric (−) electric dipole transition moments (EDTMs) of the exciton coupled dimer, $\mu_\pm(\omega)$, are given by $$\mu_+(\omega)=\sum_\alpha \mu_+^{(\alpha)}(\omega)\begin{pmatrix}+\cos\psi/2\\+\sin\psi/2\end{pmatrix} \tag{2a}$$

$$\mu_-(\omega)=\sum_{\alpha'} \mu_-^{(\alpha')}(\omega)\begin{pmatrix}-\cos\psi/2\\-\sin\psi/2\end{pmatrix} \tag{2b}$$

Angle ψ/2 specifies the orientation of the dimer in the x-y plane, the magnitudes and (spectral-dependencies of the EDTMs, $$\mu_+^{(\alpha)}(\omega) \text{ and } \mu_-^{(\alpha')},$$

are determined by the dimer conformation, and the indices, α and α', enumerate the singly-excited dimer states in order of increasing energy. The +/−EDTMs are depicted graphically in FIG. 3A of the main text. At any instant, the 'polarized' single-molecule fluorescence intensity is given by the spectral overlap and square modulus of the vector projections between the laser electric field and the total EDTM.

$$I_P(\varphi)=\sum_\alpha\int d\omega\left|E(\omega,\varphi)\cdot\mu_{tot}^{(\alpha)}(\omega)\right|^2$$

The above equation can be written as the sum of symmetric (+) and anti-symmetric (—) exciton contributions by substituting $\mu_{tot}=\mu_+ + \mu_-$:

$$I_P(\varphi)=\sum_\alpha\int d\omega\left|E(\omega,\varphi)\cdot\mu_+^{(\alpha)}(\omega)\right|^2+\sum_{\alpha'}\int d\omega\left|E(\omega,\varphi)\cdot\mu_-^{(\alpha')}(\omega)\right|^2 \tag{3}$$

The first term on the right-hand side of Eq. (2) can be identified as a symmetric exciton contribution, $I_+(\varphi)$, and the second term as an anti-symmetric exciton contribution, $I_-(\varphi)$. The separation given by Eq. (2) arises from the fact that the +/−EDTMs have orthogonal orientations. An additional consequence of the orthogonal orientations of the +/−EDTMs is that the two signal contributions have maximum values displaced in phase relative to one another by half the modulation period.

The signal contribution from the symmetric excitons is calculated first. Substitution of Eq. (1) and Eq. (2a) into the first term on the right-hand side of Eq. (3) leads to:

$$I_+(\varphi)=\sum_\alpha\int d\omega\left|E(\omega,\varphi)\cdot\mu_+^{(\alpha)}(\omega)\right|^2=|\mu_+|^2\left[\cos^2(\psi/2)\cos^2(\varphi/2)+\sin^2(\psi/2)\sin^2(\varphi/2)-2\cos(\psi/2)\sin(\psi/2)\cos(\varphi/2)\sin(\varphi/2)\right] \tag{4}$$

wherein the spectral overlap function is defined as $$|\mu_+|^2=|A(\omega)|^2\sum\nolimits_\alpha\int d\omega\left|\mu_+^{(\alpha)}(\omega)\right|^2.$$

Equation (4) can be simplified using double angle formulas to yield $$I_+(\varphi)=\frac{|\mu_+|^2}{2}[1+\cos(\varphi+\psi)] \tag{5}$$

Following a similar procedure for the anti-symmetric exciton contribution to the polarized signal by substitution of Eq. (1) and Eq. (2b) into the second term on the right-hand side of Eq. (3) leads to:

$$I_-(\varphi)=\frac{|\mu_-|^2}{2}[1-\cos(\varphi+\psi)] \tag{6}$$

where $$|\mu_-|^2=|A(\omega)|^2\sum\nolimits_\alpha\int d\omega\left|\mu_-^{(\alpha)}(\omega)\right|^2.$$

Substitution of Eqs. (5) and (6) into Eq. (3) leads to $$\begin{aligned}I_P(\varphi)&=I_+(\varphi)+I_-(\varphi)\\&=\frac{|\mu_+|^2+|\mu_-|^2}{2}\left\{1+\left[\frac{|\mu_+|^2-|\mu_-|^2}{|\mu_+|^2+|\mu_-|^2}\right]\cos(\varphi+\psi)\right\}\\&=f\{1+v\cos(\varphi+\psi)\}\end{aligned}$$

wherein the signal visibility v is:

$$v=\frac{|\mu_+|^2-|\mu_-|^2}{|\mu_+|^2+|\mu_-|^2}$$

and a mean signal rate f is:

$$f=\frac{1}{2}\left[|\mu_+|^2+|\mu_-|^2\right].$$

Example 6. Representative Linear Polarization Sweep Method

Figure 4:
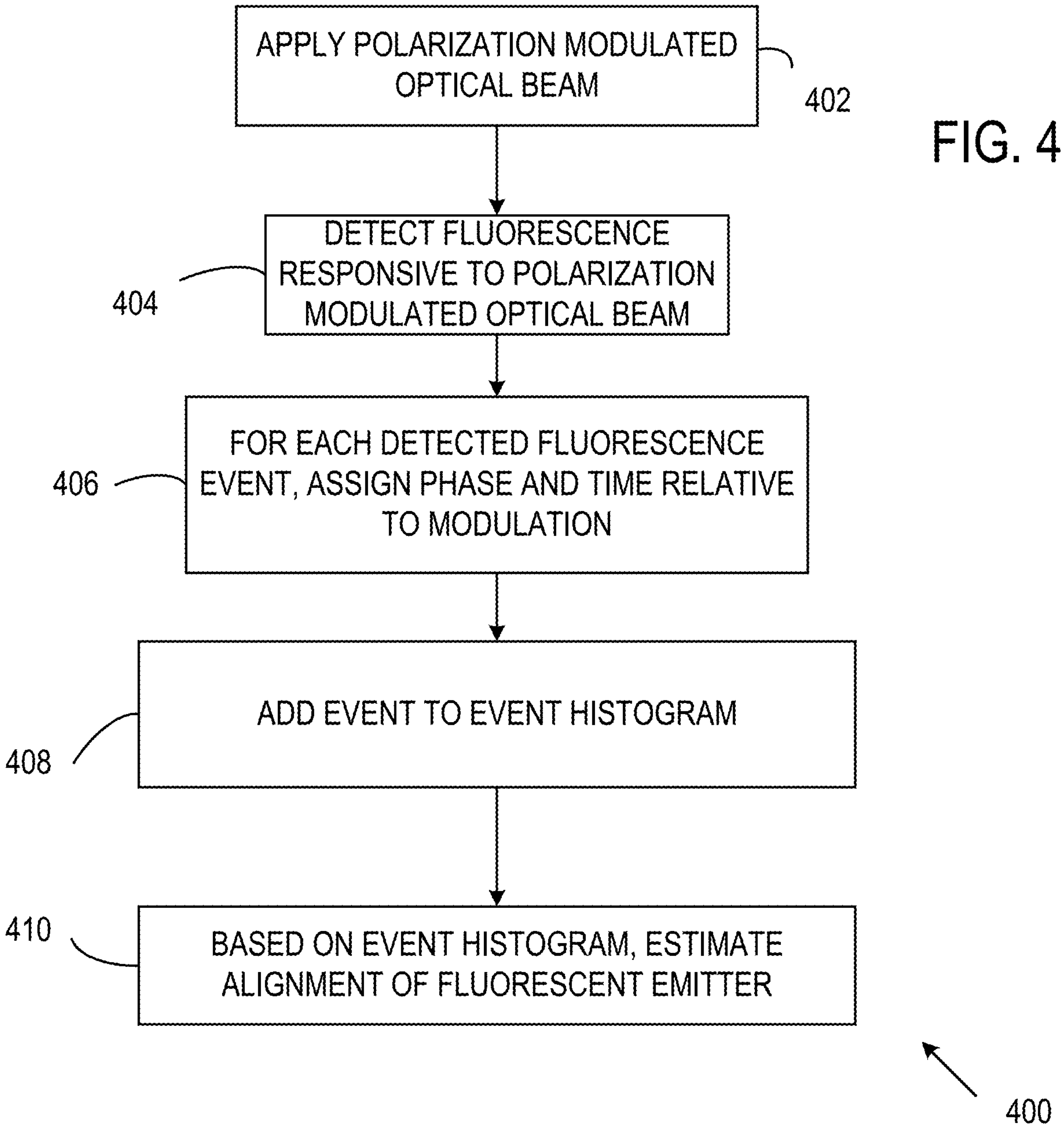
FIG. 4 illustrates a representative method.

Referring to FIG. 4, a representative method 400 includes applying a polarization modulated beam such as a swept polarization beam to a sample at 402. Fluorescence responsive to the beam is detected as 404, typically as a series of single photon detection events. At 406, each detection event is time and phase tagged with respect to the polarization modulation and added to an event histogram at 408. At 410, based on the event histogram, the alignment of the sample is estimated. In some examples, a visibility is calculated and used for this estimation.

Example 7. Nonlinear FRET Overview

The technique of fluorescence resonance energy transfer (FRET), when applied to optical microscopy, permits determination of the approach between two fluorescent molecules within several nanometers. Typical FRET microscopy techniques rely upon the absorption of light by a donor (D) fluorophore at one wavelength followed by the subsequent transfer of excitation energy to an acceptor fluorophore (A), and the emission of secondary fluorescence by the A at a longer wavelength. By measuring the emission intensities from both the D and A fluorophores, one can calculate the FRET efficiency. This is a function of the relative distance and orientation of the D and A. Because these parameters are coupled, one cannot know the specific distance because the orientation between the D-A FRET pair cannot be known. Methods and apparatus are described herein that permit measuring the relative orientation of the D-A FRET pair, so that the distance between them can be calculated. The disclosed approaches use non-linear spectroscopy on single molecules to measure spectroscopic signals in a low-flux signal detection regime (counting individual photons). Linear and nonlinear spectroscopic signals are generated by illuminating a single D-A FRET pair using two separate continuous wave laser beams. The first laser is tuned to the absorption wavelength of the D, and the second laser is tuned to the absorption wavelength of the A. The plane polarizations of the D and A lasers are each rotated ('swept') at distinct frequencies, which are faster than the rotation of the D and A fluorophores. First, the D fluorophore is excited by the D laser, and the polarization-sweep dependence of the fluorescence from the D is used to calculate the orientation of the D. Second, an optically excited D undergoes FRET to transfer its excitation energy to a nearby A. The A laser de-excites and then re-excites the A fluorophore with a probability that depends on the polarization of the A laser and the orientation of the A fluorophore. The A fluorescence is detected as a function of the phases of the polarization sweeps of both lasers, and this information can be used to extract the nonlinear signal, which contains information about the relative angle between the D and A fluorophores of the FRET pair. Once the relative angle of the FRET pair is known this can be combined with the information from the D and A intensities, which determines the FRET efficiency, to solve for the distance between the D and A molecules.

Example 8. Polarization-Sweep Nonlinear FRET System

Figure 5:
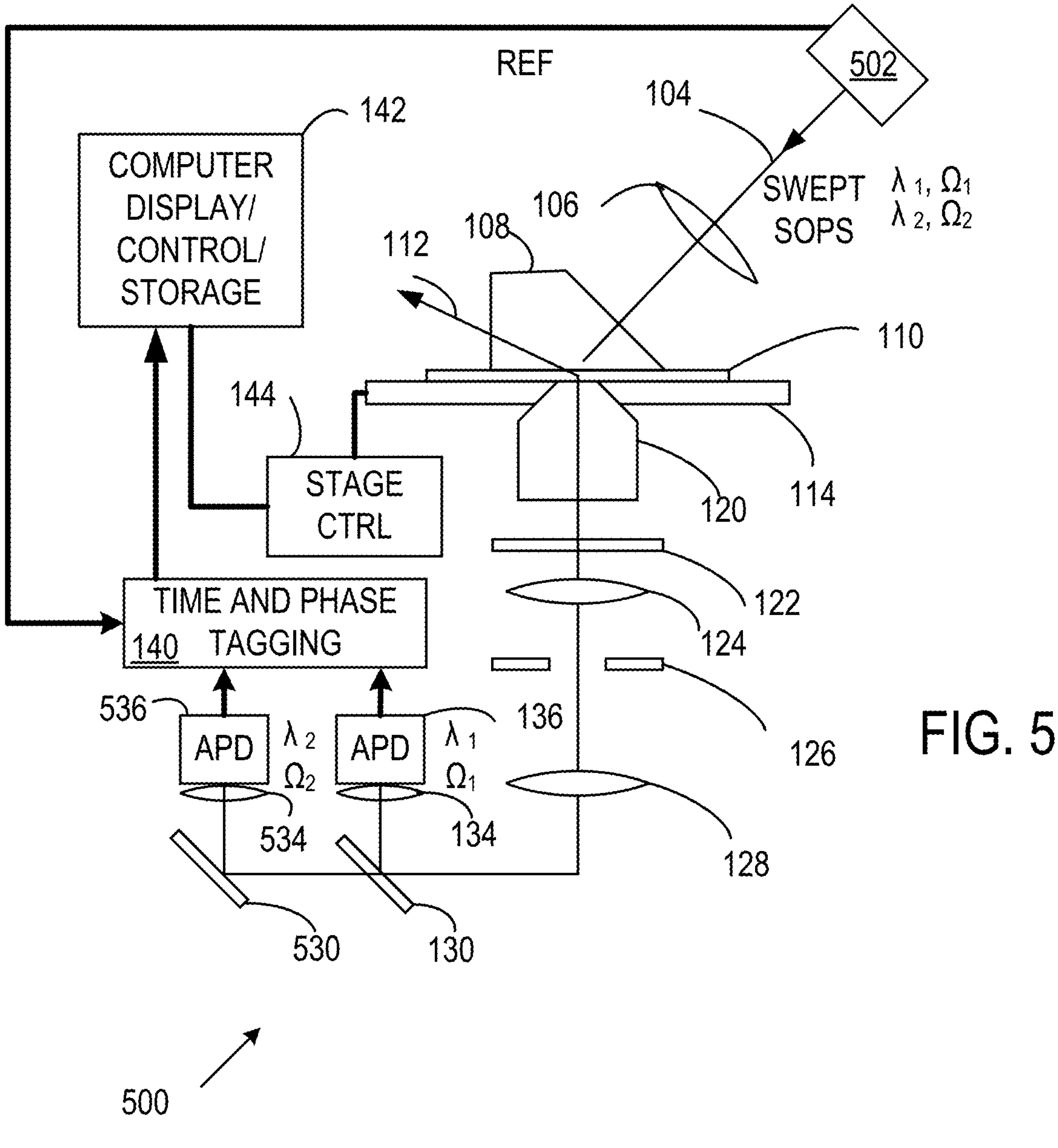
FIG. 5 illustrates a dual wavelength, swept polarization, single-molecule fluorescence measurement system configured for nonlinear FRET measurements.

Referring to FIG. 5, a representative system 500 is similar to the system 100 of FIG. 1 but includes a swept polarization source 502 that directs a swept polarization optical beam 504 that includes beams at two wavelengths $\lambda_1$ and $\lambda_2$ that are modulated such that their respective polarizations are modulated (generally swept) at frequencies $\Omega_1$ and $\Omega_2$. The reflector 130 can be a dichroic reflector so that the different wavelengths are directed to respective detectors 126, 536 with respective lenses 134, 534. Detected fluorescence signals such as signal photon detection events are time and phase tagged as discussed previously. Beam wavelength selection is discussed above, with each wavelength selected based on donor and acceptor fluorophores. For example, with $\lambda_1$ and $\lambda_2$ associated with donor and acceptor fluorophores, the fluorescence signal associated with $\lambda_1$ at a frequency associated with the polarization sweep establishes an orientation of the donor based on a fluorescence signal that corresponds to the frequency $\Omega_1$. For single photon detection, this orientation can be based on a histogram of single photon detection events that are time and phase tagged. Fluorescence signal produce by the optical beam at wavelength $\lambda_2$ produces a fluorescence signal modulated at $\Omega_1 \pm \Omega_2$ that can be used to determine an angle between the acceptor and donor. The fluorescence signal component at the sum or difference frequency can be used. As above, fluorescence is generally detected as a plurality of single photo events that are accumulated to establish time varying fluorescence.

Figure 6:
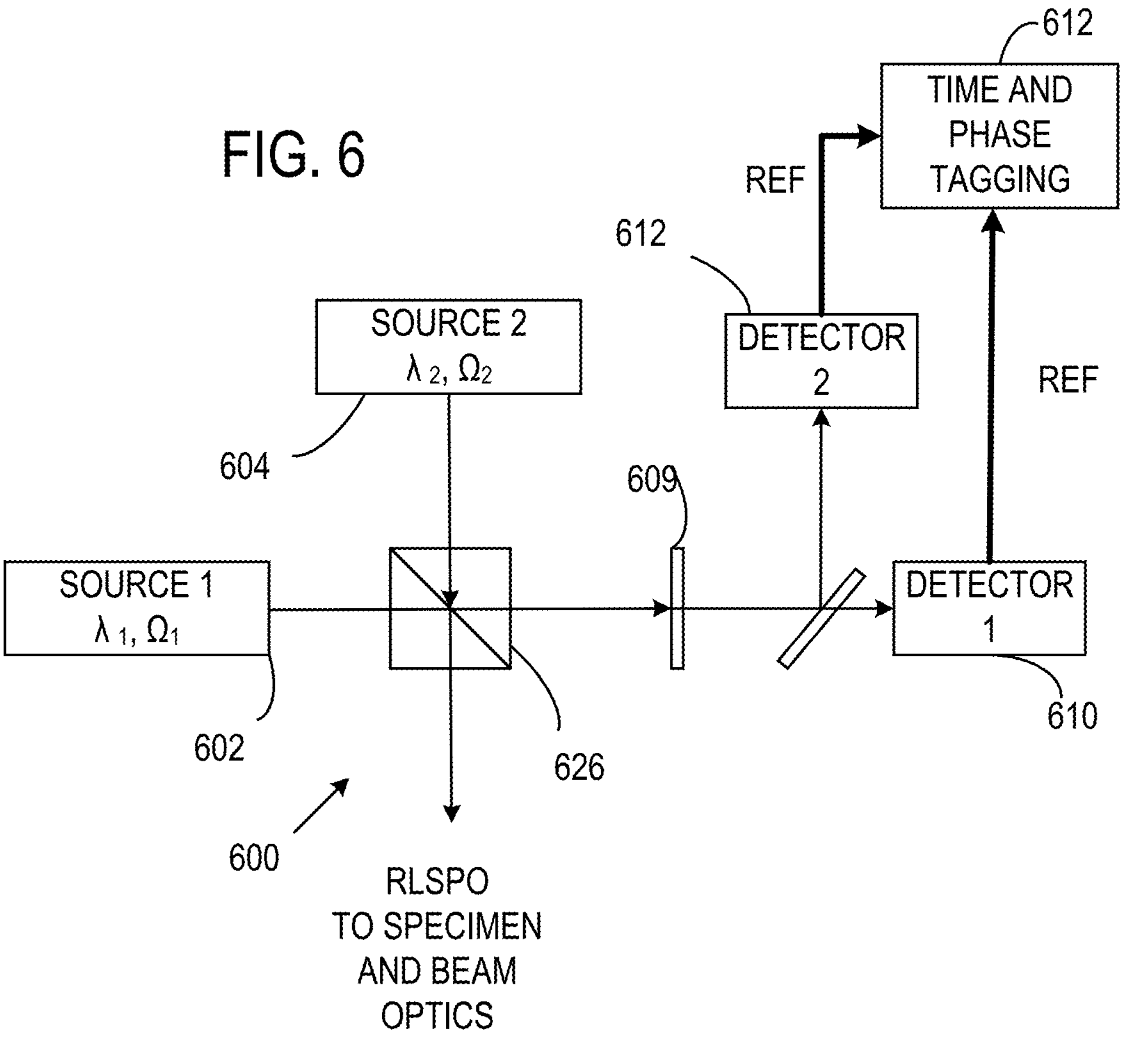
FIG. 6 illustrates a dual beam, swept polarization beam source.

FIG. 6 illustrates a dual wavelength source 600 that can be used in the system of FIG. 5. Polarization modulated optical beams at first and second wavelengths from respective sources 602, 604 (such as shown in FIG. 2) are combined with a beam splitter 626 so that portions can be directed to a sample. Other portions are directed to a polarizer 609 and then to respective detectors 610, 612 to produce reference signals that are shown coupled to a time and phase tagging system 612.

Example 9. Representative Polarization-Sweep Nonlinear FRET Method

Figure 7:
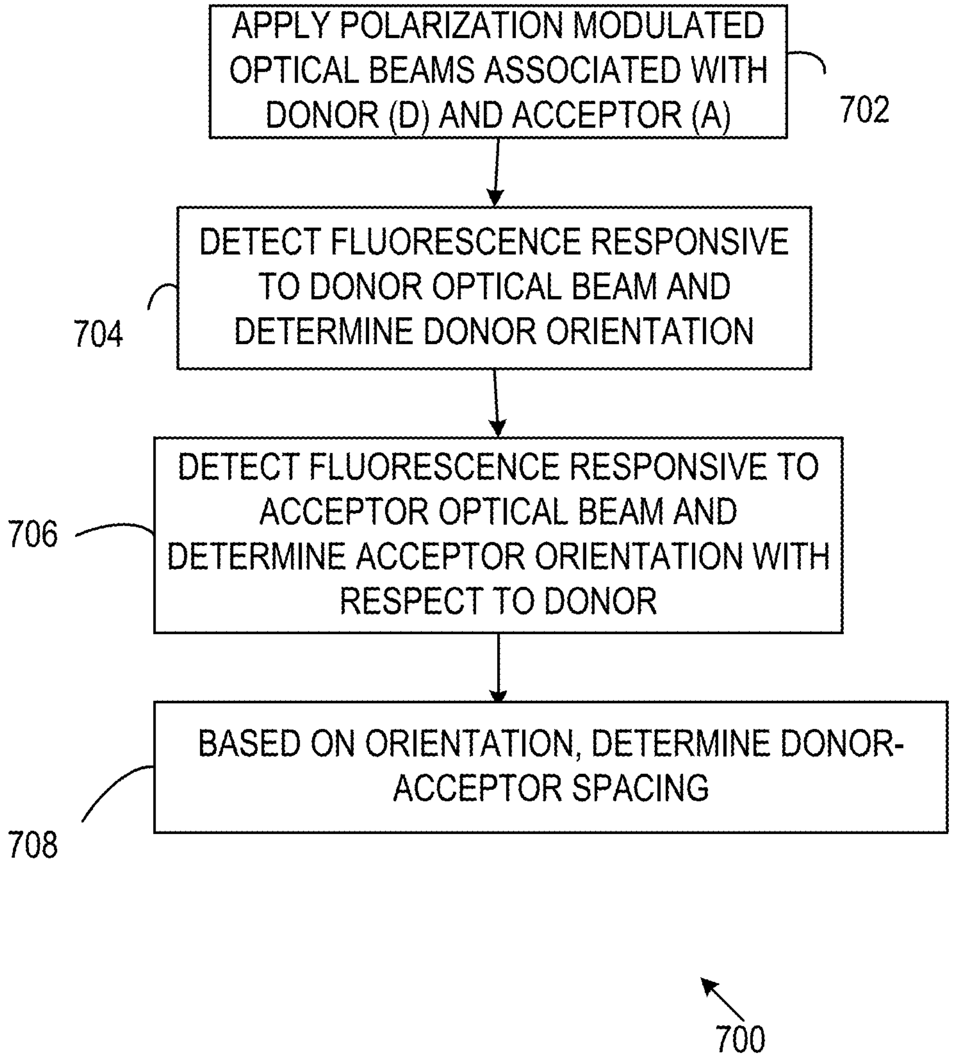
FIG. 7 illustrates a representative method for nonlinear FRET.

Referring to FIG. 7, a representative method 700 includes applying polarization modulated optical beams at wavelengths associated with excitation of a donor and an acceptor at 702 and at first and second modulation frequencies, respectively. At 704, fluorescence responsive to the donor excitation is detected and used to determine donor orientation. At 706, fluorescence responsive to the acceptor optical beam is detected to determine acceptor orientation. A selected frequency component of the detected fluorescence can be measured such at a sum or difference of the first and second modulation frequencies. At 708, donor-acceptor orientation can be determined.

Example 10. Alternative Total Internal Reflection (TIR) Systems

Figure 8:
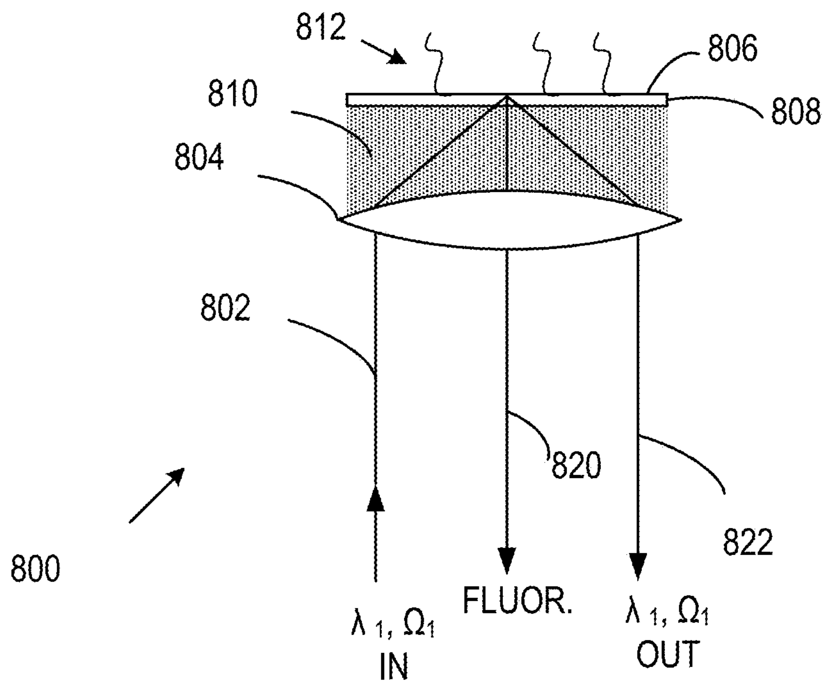
FIG. 8 illustrates an alternative optical configuration for total internal reflection fluorescence microscopy.

In FIGS. 1 and 5 above, an optical beam or beams are directed to a sample from one side and fluorescence responsive to the beams is collected on an opposite side. In these examples, a prism is used to produce TIR so that input beams and fluorescence are separated. In an alternative configuration illustrated schematically in FIG. 8, an optical system 800 is arranged so that an input beam 802 is received by a lens 804 that directs the beam 802 to be totally internally reflected at a surface 806 of a sample mounting substrate 808 such as a microscope slide. Typically an index matching or immersion fluid 810 is situated between the mounting substrate 808 and the lens 804. Samples of interest such as single molecules 812 are bound to the surface 806. Fluorescence produced by the input beam is directed as a fluorescence beam 820 for detection as described above and a totally reflected beam 822 can be directed away from a detection system.

In view of the many possible embodiments to which the principles of the disclosed technology may be applied, it should be recognized that the illustrated embodiments are only preferred examples and should not be taken as limiting the scope of the disclosure. We therefore claim all that comes within the scope and spirit of the appended claims.

We claim:

1. A measurement apparatus, comprising:

an optical beam source that produces a repetitive optical beam having a time-varying polarization state to interrogate a sample and produce fluorescence, wherein the optical beam source comprises a laser situated to produce an optical beam, a first acousto-optic modulator configured to apply a phase modulation to a first linear polarization component of the optical beam, a second acousto-optic modulator configured to apply the phase modulation to a second linear polarization component of the optical beam, wherein the second linear polarization differs from the first linear polarization, a beam splitter situated to receive and combine the first and second phase modulated linear polarization components to produce a combined beam, a quarter-wave retarder configured to receive the combined beam and produce the repetitive optical beam so that the repetitive optical beam has the time-varying polarization state in the form of a linear polarization sweep to interrogate the sample and produce the fluorescence; and a detection system that comprises a detector situated to receive the fluorescence from the sample responsive to the repetitive optical beam and produce a fluorescence signal, time/phase tagging electronics coupled to the optical beam source to associate the linear polarization sweep and the fluorescence signal, and a processor operable to establish a sample orientation based on the fluorescence signal and the linear polarization sweep.

2. The measurement apparatus of claim 1, wherein the time-varying polarization state is a variation in linear polarization between orthogonal linear polarization states.

3. The measurement apparatus of claim 2, wherein the time-varying polarization state is a periodic linear polarization sweep.

4. The measurement apparatus of claim 3, wherein the fluorescence signal comprises a plurality of single photon detection events that are time and phase tagged with respect to the periodic linear polarization sweep.

5. The measurement apparatus of claim 1, wherein the detection system is operable to determine a fluorescence signal visibility defined as a ratio $$\frac{(I_{MAX} - I_{MIN})}{(I_{MAX} + I_{MIN})},$$

wherein $I_{MAX}$ and $I_{MIN}$ correspond to maxima and minima of the fluorescence signal.

6. A method, comprising:

applying a polarization modulated optical beam to a sample to interrogate the sample and produce a fluorescence;

detecting the fluorescence with a single photon detector as a plurality of single photon detection events;

associating a phase and time to each of the detection events, wherein the phase and time are tagged with respect to the modulation of the polarization modulated optical beam; and based on the detection events and the associated phases and times of the fluorescence produced in response to the polarization modulated optical beam, determining a sample orientation.

7. The method of claim 6, wherein the polarization modulated optical beam is a linear swept polarization optical beam.

8. The method of claim 6, wherein the polarization modulated optical beam includes a variation in linear polarization between orthogonal linear polarization states.

9. The method of claim 6, further comprising defining a histogram of detection events as a function of the associated phases and determining a visibility that is based on minima and maxima of the histogram of detection events.

10. The method of claim 6, further comprising producing the polarization modulated optical beam by phase modulating at least one linear polarization component of an input optical beam.

11. The method of claim 6, further comprising producing the polarization modulated optical beam by phase modulating first and second linear polarization components of an input optical beam and combining the phase modulated first and second linear polarization components.

12. The method of claim 11, further comprising directing the combined phase modulated first and second linear polarization components to a quarter wave retarder to produce a linear polarization sweep.

13. The method of claim 6, further comprising defining histogram of detection events as a function of the associated phases and determining a visibility based on the histogram of detection events, wherein the visibility is defined as $$\frac{(I_{MAX} - I_{MIN})}{(I_{MAX} + I_{MIN})}$$

wherein $I_{MAX}$ and $I_{MIN}$ are maximum and minima values associated with variation in numbers of the detection events as a function of phase.

14. The measurement apparatus of claim 1, wherein the repetitive optical beam is a first repetitive optical beam and the optical beam source is configured to produce a second repetitive optical beam, wherein the first and second repetitive optical beams have time-varying polarization states at respective first and second wavelengths and different respective first and second modulation frequencies; and wherein the detector is a first detector and the detection system includes a second detector, wherein the first and second detectors are configured to receive the fluorescence from the sample responsive to the first and second repetitive optical beams, respectively, and to produce the fluorescence signal as first and second fluorescence signals, wherein the processor being operable to establish the sample orientation based on the fluorescence signal and the linear polarization sweep comprises being operable to establish an orientation of a first sample component based on the first fluorescence signal and an orientation of a second sample component based on a modulation of the second fluorescence signal at a frequency corresponding to a sum or difference of the first and second modulation frequencies.

15. The measurement system of claim 14, wherein the second repetitive optical beam is produced by combining phase modulated third and fourth linear polarization components and directing the second combined beam to a second quarter wave retarder to produce variable linear polarizations.

16. The measurement apparatus of claim 14, wherein the first and second fluorescence signals comprise respective pluralities of single photon detection events.

17. The measurement apparatus of claim 16, wherein the single photon detection events associated with the first and second repetitive optical beams are phase and time tagged with the time/phase tagging electronics and combined in respective first and second event histograms, wherein the orientation of at least the first or second sample component is based on a visibility associated with the respective histogram.

18. The measurement apparatus of claim 14, wherein the first sample component includes a donor fluorophore and the second sample component includes an acceptor fluorophore.

19. The method of claim 6, wherein the applying a polarization modulated optical beam to interrogate the sample and produce a fluorescence comprises applying a first polarization modulated optical beam and applying a second polarization modulated optical beam to the sample, wherein the first and second polarization modulated optical beams are applied at respective first and second wavelengths and different respective first and second frequencies;

wherein the detecting the fluorescence with a single photon detector as a plurality of single photon detection events comprises accumulating fluorescence signal events corresponding to fluorescence produced in response to the first and second polarization modulated optical beams;

wherein the determining the sample orientation comprises, based on the fluorescence signal events associated with the first wavelength and the first frequency, determining an orientation of a first sample component; and based on the fluorescence signal events associated with the second wavelength and a sum of or difference between the first frequency and the second frequency, determining an orientation of a second sample component.

20. The measurement apparatus of claim 19, wherein the first sample component includes a donor fluorophore and the second sample component includes an acceptor fluorophore.

21. The measurement apparatus of claim 1, wherein the first and second acousto-optic modulators are configured to operate at different frequencies so that the linear polarization sweep of the combined beams is rotated at a frequency corresponding to the difference between the two different frequencies.

22. A method, comprising:

producing a polarization modulated optical beam by phase modulating first and second linear polarization components of an input optical beam, combining the phase modulated first and second linear polarization components, and directing the combined phase modulated first and second linear polarization components to a quarter wave retarder to produce a linear polarization sweep;

applying the polarization modulated optical beam to a sample to interrogate the sample and produce a fluorescence;

detecting the fluorescence as a plurality of detection events; and based on the plurality of detection events produced in response to the polarization modulated optical beam, determining a sample orientation.

23. A method, comprising:

applying, by an optical beam source, a polarization modulated repetitive optical beam having a time-varying polarization state to a sample to interrogate the sample and produce a fluorescence, wherein the optical beam source comprises a laser situated to produce an optical beam, a first acousto-optic modulator configured to apply a phase modulation to a first linear polarization component of the optical beam, a second acousto-optic modulator configured to apply the phase modulation to a second linear polarization component of the optical beam, wherein the second linear polarization differs from the first linear polarization, a beam splitter situated to receive and combine the first and second phase modulated linear polarization components to produce a combined beam, and a quarter-wave retarder configured to receive the combined beam and produce the repetitive optical beam so that the repetitive optical beam has the time-varying polarization state in the form of a linear polarization sweep to interrogate the sample and produce the fluorescence;

detecting the fluorescence as a plurality of single photon detection events;

associating a phase and time to each of the detection events, wherein the phase and time are tagged with respect to the modulation of the polarization modulated repetitive optical beam; and based on the detection events and the associated phases and times of the fluorescence produced in response to the linear polarization sweep of the repetition optical beam, determining a sample orientation.

* * * * *